US010709632B2

(12) United States Patent
Endo (10) Patent No.: US 10,709,632 B2
(45) Date of Patent: Jul. 14, 2020

(54) PEDOMETER, WALKING ASSIST DEVICE AND PEDOMETRIC COMPUTER PROGRAM PRODUCT

(71) Applicant: HONDA MOTOR CO., LTD., Tokyo (JP)

(72) Inventor: Yosuke Endo, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 833 days.

(21) Appl. No.: 15/263,558

(22) Filed: Sep. 13, 2016

(65) Prior Publication Data
US 2017/0071814 A1 Mar. 16, 2017

(30) Foreign Application Priority Data
Sep. 14, 2015 (JP) .................................. 2015-180464

(51) Int. Cl.
*A61H 3/00* (2006.01)
*G01C 22/00* (2006.01)
*A61H 1/02* (2006.01)

(52) U.S. Cl.
CPC ............. *A61H 3/00* (2013.01); *G01C 22/006* (2013.01); *A61H 1/0244* (2013.01); *A61H 2003/007* (2013.01); *A61H 2201/5069* (2013.01)

(58) Field of Classification Search
CPC .................... A61H 3/00; A61H 1/0244; A61H 2201/5069; A61H 2003/007; G01C 22/006
See application file for complete search history.

(56) References Cited

U.S. PATENT DOCUMENTS 4,962,469 A * 10/1990 Ono .................... G01C 22/006
235/105

FOREIGN PATENT DOCUMENTS

| JP | H09276348 A | 10/1997 |
| JP | 2008276581 A | 11/2008 |
| JP | 2010071779 A | 4/2010 |
| JP | 2012205826 A | 10/2012 |
| JP | 5758028 B1 | 8/2015 |
| JP | 2015139665 A | 8/2015 |

OTHER PUBLICATIONS

Notification of Reasons for Refusal for Japanese Patent Application No. 2015-180464, dated Nov. 1, 2018, 2 pages.

* cited by examiner

*Primary Examiner* — Sujoy K Kundu
*Assistant Examiner* — L. Anderson
(74) *Attorney, Agent, or Firm* — Armstrong Teasdale LLP (57) ABSTRACT

To measure the number of steps of a user in a more precise manner, the pedometer of the present invention comprises a state variable detection unit for detecting a state variable indicating a walking movement of a user, a walking step determination unit for determining each walking step of the user from an output of the state variable detection unit, a walking information storage unit for incrementing a step count each time a walking step is determined by the walking step determination unit and storing the incremented step count and the associated time information obtained by a clock, and a walking step count computation unit for computing a walking step count of the user from a time point of initiating the measurement operation to a time point of terminating the measurement operation to a decimal part according to the step count and the associated time information stored in the walking information storage unit.

12 Claims, 7 Drawing Sheets

PEDOMETER, WALKING ASSIST DEVICE AND PEDOMETRIC COMPUTER PROGRAM PRODUCT

TECHNICAL FIELD

The present invention relates to a pedometer for counting walking steps of a user, a walking assist device incorporated with a pedometer and a pedometric computer program product.

BACKGROUND ART

Known pedometers are designed to count the walking steps of a user, for instance, according to the detection signal of an acceleration sensor worn by the user (see JP2010-71779A, for instance). In a known walking assist device, the detection signal of a contact sensor for detecting the contact of the sole of the foot of the user is used for counting the walking steps of the user (see JP2012-205826A).

A pedometer using an acceleration sensor or a contact sensor for detecting the walking steps of the user may be able to count the walking steps of a non-handicapped person, but may be unable to correctly count the walking steps of a handicapped person with an irregular gait. To overcome this problem, it was proposed to produce a differential angle signal from the right hip joint angle signal and the left hip joint angle signal obtained by a right angular position sensor and a left angular position sensor, respectively, and the count of the walking steps of the user is computed from the differential angle signal (see JP5758028B).

SUMMARY OF THE INVENTION

When training or rehabilitating a person with walking impairment, it is desirable to numerically evaluate the gait of the person, and the number of steps required to travel a prescribed distance may be required to be measured for such purposes. Conventional pedometers were designed to count the number of steps only as integers, and were not precise to a value less than one or to decimal places. Therefore, when the effectiveness of a rehabilitation process is required to be evaluated, the measurement data of the conventional pedometers is often inadequate for accurate evaluation.

SUMMARY OF THE INVENTION

The present invention was made in view of such problems of the prior art, and has a primary object to provide a pedometer that can measure the number of steps of a user in a more precise manner.

To achieve such an object, the present invention provides a pedometer, comprising: a clock for obtaining time information associated with a walking movement of a user; a switch for initiating and terminating a measurement operation of the pedometer; a state variable detection unit for detecting a state variable indicating the walking movement of the user; a walking step determination unit for determining each walking step of the user from an output of the state variable detection unit; a walking information storage unit for incrementing a step count each time a walking step is determined by the walking step determination unit and storing the incremented step count and the associated time information obtained by the clock; and a walking step count computation unit for computing a walking step count of the user from a time point of initiating the measurement operation to a time point of terminating the measurement operation to a decimal part according to the step count and the associated time information stored in the walking information storage unit.

By taking into account the time information, the walking step counts can be computed to the precision of the decimal part.

According to a preferred embodiment of the present invention, the walking step count computation unit is configured to compute a walking step count at the time point of terminating the measurement operation according to the step count stored in the walking information storage unit and a time interval between an end of a last full walking step and the time point of terminating the measurement operation.

Preferably, the walking step count at the time point of terminating the measurement operation may be computed as a sum of the step count stored in the walking information storage unit and a ratio of a time interval between the end of the last full walking step and the time point of terminating the measurement operation to a prescribed walking period of the user.

The prescribed walking period may be selected in a number of different ways. It may be a value arbitrarily selected by the operator, typically based on past experience, and may be selected in dependence on each particular user, but, more preferably, may be obtained as a time period required for a full walking step preceding the time point of terminating the measurement operation or a full walking step following the time point of terminating the measurement operation.

As the walking period of each user is less likely to vary in a short time period, a higher accuracy may be obtained by using a recent walking period of the particular user as the walking period that is used for computing the decimal part step count of the user.

It is particularly preferable when the walking period of the user is obtained as a time period required for a full walking step immediately preceding the time point of terminating the measurement operation or a full walking step immediately following the time point of terminating the measurement operation.

According to another preferred embodiment of the present invention, the walking period of the user is obtained as an average of time periods required for a plurality of full walking steps preceding and/or following the time point of terminating the measurement operation.

Thereby, the walking period may be selected without being disturbed by any short term fluctuations, and a higher accuracy can be achieved.

According to yet another preferred embodiment of the present invention, the walking period of the user is obtained as a time period required to complete a walking step which was in progress at the time point of terminating the measurement operation.

As the time period required to complete a walking step which was in progress at the time point of terminating the measurement operation provides a most current walking period of the user, a high accuracy can be achieved.

If desired, the walking period of the user may be obtained as an average of a time period required to complete a walking step which was in progress at the time point of terminating the measurement operation, and at least a time period required for one full walking step preceding or following the time point of terminating the measurement operation.

Thereby, the walking period can be obtained from the most current data without being disturbed by any short term fluctuations.

According to yet another embodiment of the present invention, the walking information storage unit is configured to increment the step count according to a difference between steps made by a right leg and a left leg of the user, and to store the incremented step count with an indication whether the last step count is caused by the right leg or the left leg.

Because a walking impairment of the user may be asymmetric or one of the legs of the user may be more impaired than the other, it is advantageous to record the steps of the two legs individually. Normally, each walking step is determined as a difference between the steps or movements of the two legs.

In order to account for the asymmetric nature of any particular walking impairment, it is advantageous if the walking period of the user is obtained as a time period required for a full walking step preceding the time point of terminating the measurement operation by two steps or a full walking step following the time point of terminating the measurement operation by two steps. Alternatively, the walking period of the user may be obtained as an average of time periods required for a plurality of walking steps made by one of the legs of the user preceding and/or following the time point of terminating the measurement operation, the one leg being the one that has made the walking step that was in progress at the time point of terminating the measurement operation.

The start point of the measurement operation may be set at the time point where the user is stationary and is about to start walking. In such a case, the initial step count is zero. However, it is more accurate for most purposes to start the measurement of the step count when the user is already walking. In this case, the walking step count computation unit may compute a step count at the time point of starting the measurement operation according to the step count stored in the walking information storage unit and a time interval between an end of a first full walking step and the time point of starting the measurement operation so that the step count at the time point of starting the measurement operation may be determined to the accuracy of the decimal part thereof. Preferably, the walking step count computation unit is configured to compute the step count at the time point of starting the measurement operation as a sum of the step count stored in the walking information storage unit and a ratio of the time interval between the end of the last full walking step and the time point of starting the measurement operation to a prescribed walking period of the user. The prescribed walking period of the user may be computed in a manner similar as in the case of computing the walking step count at the time point of terminating the measurement operation.

The present invention also provides a walking assist device, comprising: a walking assist unit configured to be worn by a user to apply a force to a body part of the user for assisting the user to walk; and the pedometer configured as mentioned above and incorporated in the walking assist unit.

The present invention also provides a computer program product, comprising: a non-transitory computer-readable medium comprising: at least one instruction for obtaining time information associated with a walking movement of a user; at least one instruction for initiating and terminating a measurement operation; at least one instruction for detecting a state variable indicating the walking movement of the user; at least one instruction for determining each walking step of the user from the detected state variable; at least one instruction for incrementing a step count each time a walking step is determined and storing associated time information that is obtained; and at least one instruction for computing a walking step count of the user from a time point of initiating the measurement operation to a time point of terminating the measurement operation to a decimal part according to the step count and the associated time information.

DESCRIPTION OF THE PREFERRED EMBODIMENT(S)

Preferred embodiments of the present invention are described in the following with reference to the appended drawings. In the following description, because the walking assist device and the associated anatomy of the wearer are symmetric, the numerals denoting various components and parts may be accompanied by suffices to indicate on which side of the wearer the component or the part is located. When such a component or a part is collectively referred to, the suffix may be omitted. Also, because of the symmetry, only one of the two components may be discussed when appropriate as representing the other in the following description.

Figure 1:
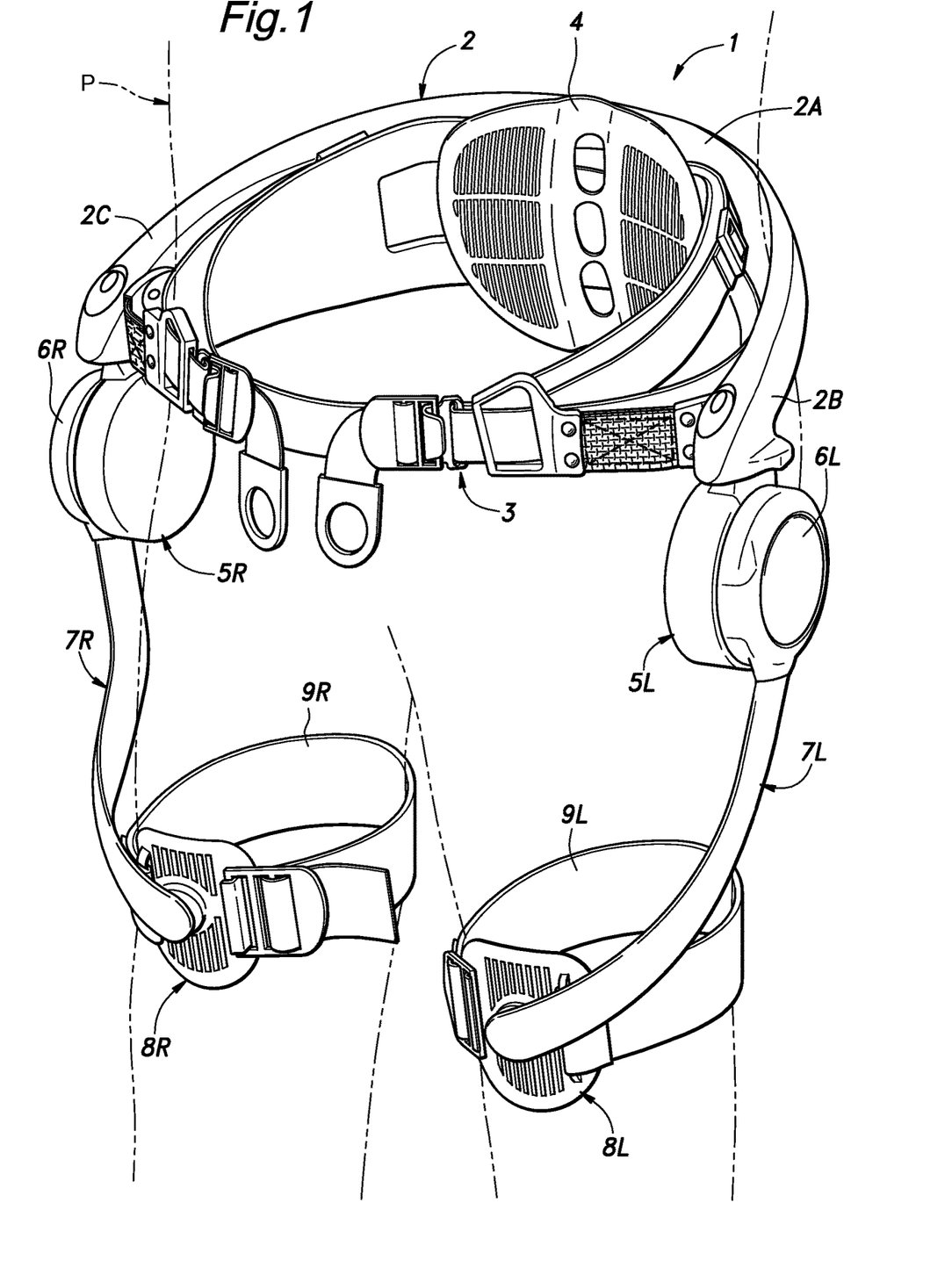
FIG. 1 is a perspective view of a walking assist device embodying the present invention.

As shown in FIG. 1, the walking assist device 1 is worn on a pelvic part of a wearer P, and is provided with a main frame (pelvic frame) 2 having a shape of letter C in plan view and surrounding the pelvic part of the wearer P. The main frame 2 is made of hard and stiff material.

An abdominal belt 3 is positioned along the inner circumferential surface of the main frame 2, and is wrapped around the abdominal/pelvic part of the wearer P in cooperation with the back part of the main frame 2. The abdominal belt 3 is made of flexible material such as fabric and leather, and is provided with fittings to allow the length of the abdominal belt 3 to be adjusted, and the opposing free ends thereof to be detachably joined to each other. The rear part of the abdominal belt 3 is provided with a back support plate 4 configured to support the lower back part of the wearer P.

Although not shown in the drawings, a rear part 2A of the main frame 2 is internally incorporated with a control unit 10 (see FIG. 3) and a detachable battery for supplying electric power to the walking assist device 1. The rear side of the central back part of the main frame 2 is provided with an operation console 11 (see FIG. 3) including an activation switch. By turning on and off this activation switch, the walking assist device 1 can be activated and deactivated.

The free ends or front ends 2B and 2C of the main frame 2 are positioned on either side of the pelvic part of the wearer P, and an electric motor unit 5 is attached to a lower side of each of the front ends 2B and 2C of the main frame 2 via a hinge having a hinge shaft extending in the fore and aft direction. Each electric motor unit 5 is therefore pivotable around the anterior-posterior axis of the wearer P, and can be positioned in alignment with the hip joint of the wearer P. Each electric motor unit 5 includes a casing, an electric motor received in the casing and an angular position sensor 6 for detecting the angular position of the output shaft of the electric motor.

The output shaft of each electric motor is connected to a base end of a swing arm 7 in a detachable manner. Thus, the swing arm 7 is pivotally supported by the main frame 2 on the corresponding side thereof so that the swing arm 7 powered by the electric motor undergoes a reciprocating swinging motion around the rotational center line of the corresponding hip joint of the wearer P. The swing arm 7 is made of high stiffness material such as aluminum or other light metallic material, glass fiber reinforced plastic material and carbon fiber reinforced plastic material, and is given with a slight twist so as to extend from the part adjoining the hip joint to the front part of the femoral part along the femoral part of the wearer. The free end of the swing arm 7 is located on a front part of the femoral part slightly above the knee.

The free end of the swing arm 7 is connected to a femoral support plate 8 via a ball joint. The femoral support plate 8 is made of plastic material, and is curved so as to conform to the opposing surface of the femoral part of the wearer P. A femoral belt 9 is attached to the femoral support plate 8 so that the femoral belt 9 may be passed around the femoral part of the wearer P in cooperation with the femoral support plate 8.

The walking assist device 1 is worn by the wearer P by fixing the main frame 2 on the pelvic part of the wearer P with the aid of the abdominal belt 3 and securing the free end of the swing arm 7 to the femoral part of the wearer P with the femoral support plate 8 and the corresponding femoral belt 9. Therefore, the swing arm 7 swings back and forth as the femoral part of the wearer P is swung back and forth.

The swinging movement of each swing arm 7 is detected by the angular position sensor 6 of the electric motor unit 5. The angular position sensor 6 in this case consists of an absolute type rotary encoder that can detect the absolute angle of the swing arm 7 relative to the main frame 2. The angular position detected by the angular position sensor 6 is converted into the hip joint angle of the corresponding femoral part by a corresponding detection circuit 21, 22, and this data is forwarded to the system control unit 20. In this regard, the angular position sensor 6 functions as a state variable detector for detecting a state variable that changes with the walking movement of the wearer P.

Figure 2:
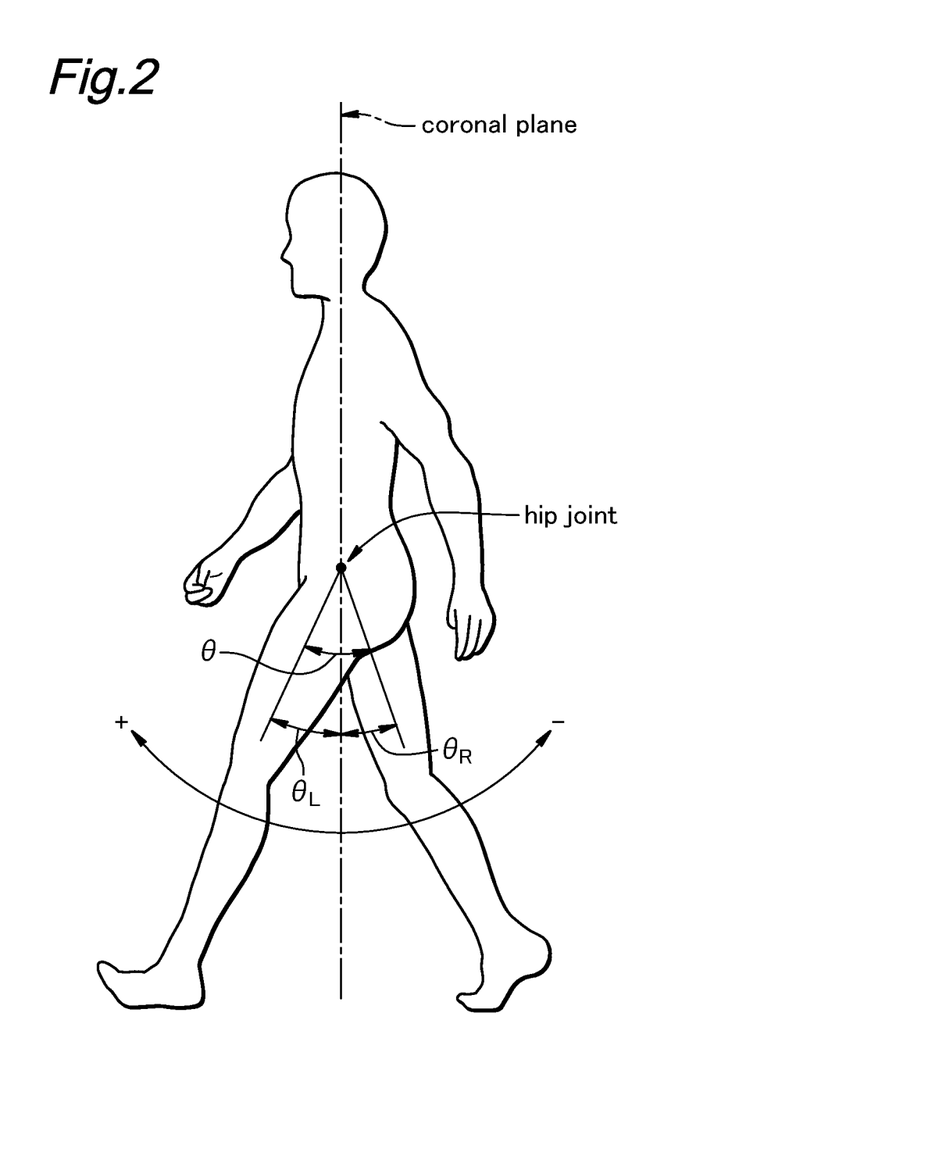
FIG. 2 is a diagram illustrating the definition of the hip joint angle and the differential angle.

As shown in FIG. 2, the hip joint angle $\theta$ is defined as an angle formed between a line extending along the corresponding femoral part and the coronal plane as viewed from sideways. The hip joint angle $\theta$ is positive in sign when the femoral part is thrown forward from the coronal plane, and negative in sign when the femoral part is thrown backward from the coronal plane.

The control unit 10 controls the electric motors of the electric motor units 5 according to the detection signals of the angular position sensors 6 such that the torque optimum for the walking movement of the wearer P may be produced. As a result, the power produced by the electric motors is transmitted to the femoral parts of the wearer P via the swing arms 7, the femoral support plates 8 and the femoral belts 9, and the swing arms 7 are angularly actuated so that a walking assist force optimum for the given walking movement of the wearer P may be applied to the femoral parts of the wearer P.

The control unit 10 essentially consists of a computer including various electronic components such as CPU, RAM and ROM incorporated in the main frame 2, and configured to execute the computation processes for controlling the operation of the electric motor units 5 or computing the assist force acting upon the femoral parts of the wearer P. The control unit 10 further counts the number of walking steps of the wearer P from the detection signal of the angular position sensors 6 as a natural number (positive integer), in particular for the purpose of conducting walking tests which will be discussed hereinafter.

The control unit 10 is configured to execute the computation process in the following sense. A system control unit 20 essentially consisting of a central processing unit (CPU) is programed so as to read data and application software from a storage unit 25 (such as memory) as shown in FIG. 3, and execute prescribed computations as defined by the software.

The walking assist device 1 described above assists the walking movement of the wearer P by providing the power of the electric motor units 5 (which are powered by the battery) to the femoral parts of the wearer P as a walking assist force via the main frame 2 and the swing arms 7. As will be discussed in the following, the walking assist device 1 is also configured to count the number of walking steps of the wearer P and computes the measured step count S in the walking test, in cooperation with an external device 27 (FIG. 3).

Figure 3:
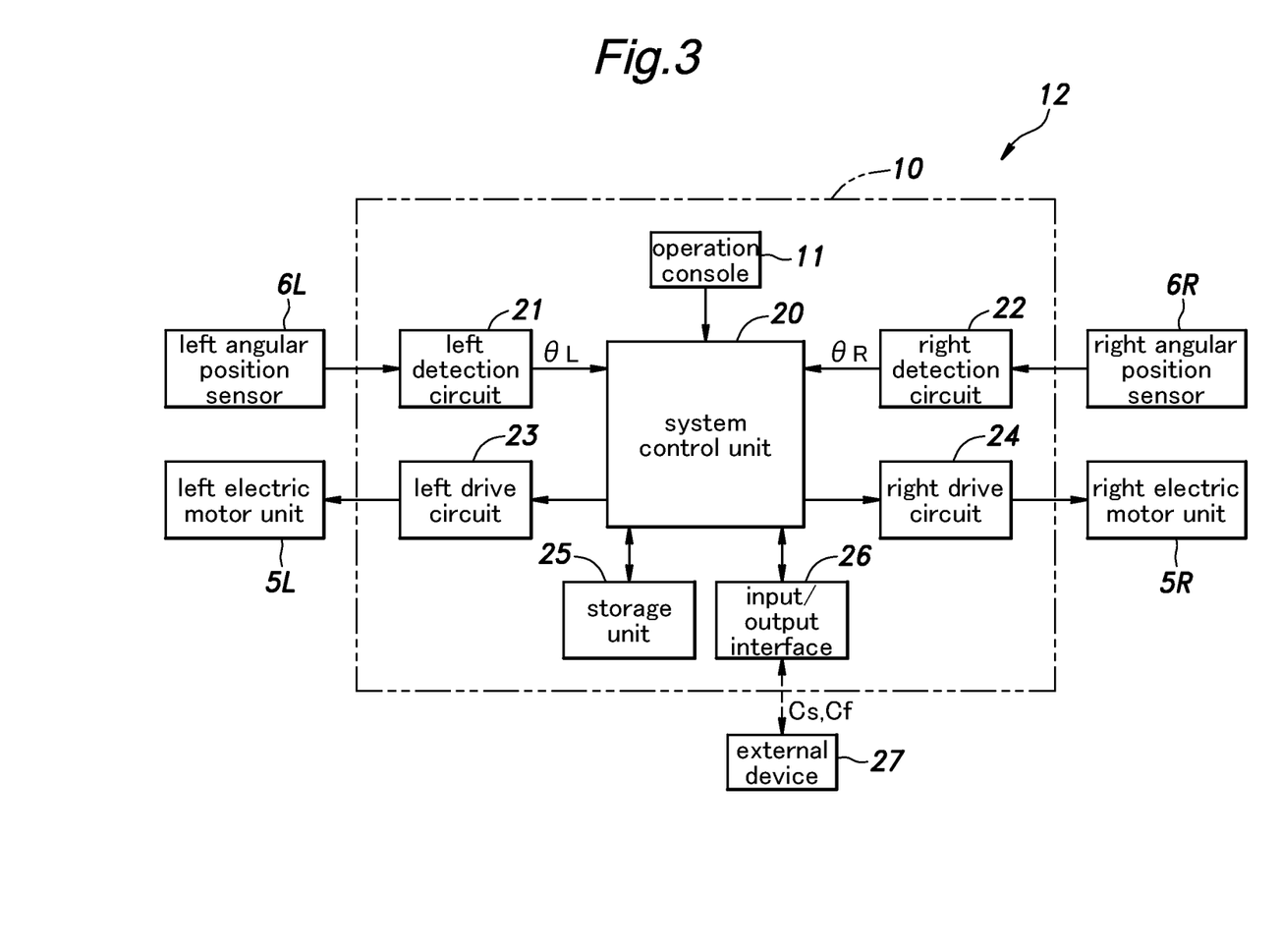
FIG. 3 is a block diagram of a control unit incorporated in the walking assist device shown in FIG. 1.

The angular position sensors 6, the control unit 10 and the external device 27 jointly form a step counting unit 12 (FIG. 3). In the illustrated embodiment, the external device 27 is not incorporated in the walking assist device 1 itself. However, it may be arranged such that a device having the functions of the external device 27 is incorporated in the walking assist device 1 so that the step counting unit 12 is entirely internally incorporated in the walking assist device 1. Alternatively, the angular position sensors 6 may be internally incorporated in the walking assist device 1 while the control unit 10 provided with the functions of the external device 27 consists of a terminal such as a tablet computer which is configured to communicate with the angular position sensors 6 either by a wired or wireless communication.

The walking test consists of counting walking steps according to a prescribed set of rules, and can be performed either with or without the walking assist force. For instance, the walking test may consist of counting the walking steps required to travel a prescribed distance. In this case, the testee may be walking with a constant rhythm or constant gait at the time point of starting a measurement operation and/or ending the measurement operation. Alternatively, the testee may travel the prescribed distance by starting from a stationary condition. By comparing the results of tests conducted in this manner, the parameters of the walking movement of the testee such as the step size can be obtained, and by comparing the results of such tests, the changes in the gait of the testee can be numerically evaluated.

Furthermore, the walking test may consist of measuring the number of steps that are taken during a walking movement lasting for a prescribed period of time. In this case, the number of steps may be counted when the testee walks with a constant rhythm or gait throughout the testing period (including the time point of starting a measurement operation and/or ending the measurement operation) or, alternatively, when the testee starts walking from a stationary condition. By carrying out such a walking test, the speed or the gait of the walking movement of the testee can be measured, and the changes in the gait of the testee over time can be evaluated by comparing the results of a multiple number of walking tests.

In the illustrated embodiment, the walking test is conducted by counting the number of walking steps of a testee who walks or travels a prescribed distance with a constant rhythm.

The control elements that form the walking assist device 1 are described in the following. As shown in FIG. 3, the system control unit 20 implemented by the CPU of the control unit 10 centrally controls various control elements which are mutually connected to one another so as to perform input and/or output functions either directly or indirectly.

The system control unit 20 receives the detection result of the left angular position sensor 6L via the left detection circuit 21, and the detection result of the right angular position sensor 6R via the right detection circuit 22. The detection results supplied to the system control unit 20 include the left hip joint angle θL and the right hip joint angle θR which are shown in FIG. 3.

According to the left hip joint angle θL and the right hip joint angle θR that are received, the system control unit 20 controls the left electric motor unit 5L via the left drive circuit 23, and the right electric motor unit 5R via the right drive circuit 24. More specifically, the system control unit 20 computes the assist force for the left femoral part, and forwards the computed result to the left drive circuit 23, and likewise computes the assist force for the right femoral part, and forwards the computed result to the right drive circuit 24. The left drive circuit 23 and the right drive circuit 24 produce an analog drive voltage or a PWM controlled voltage according to the received computed results, and apply the voltage to the electric motor units 5.

The assist force that is produced by the system control unit 20 can be determined in any of the per se known methods. Also, the assist force may be selected in dependence on the particular selected operation mode. For instance, when the assist force is intended to be applied to a patient undergoing a rehabilitation, the assist force may be directed in the same direction as the movement of the femoral part of the patient. When the assist force is intended to strengthen the muscle power of an athlete, the assist force may be in large part directed in the opposite direction to the movement of the femoral part of the athlete.

Figure 4:
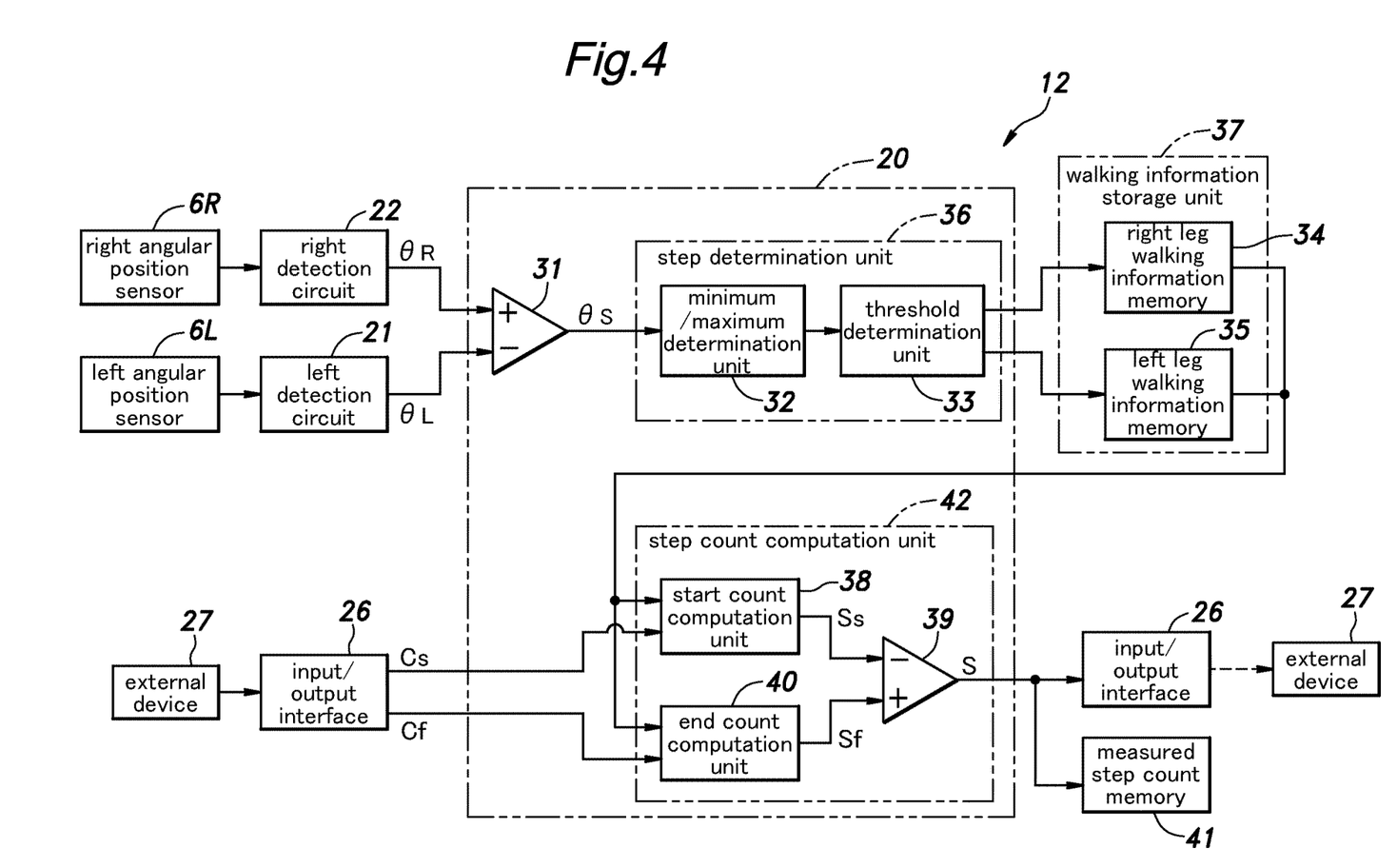
FIG. 4 is a block diagram showing the details of the system control unit of the control unit shown in FIG. 3.

As shown in FIG. 4, the system control unit 20 comprises a step determination unit 36 that detects each step of the wearer P during a walking movement according to the received left hip joint angle θL and right hip joint angle θR, and a step count computation unit 42 for computing the measured number of steps S in the walking test as will be discussed hereinafter.

The operation console 11 includes the activation switch, and accepts various other commands from the operator. For instance, an adjustment knob for adjusting the magnitude of the assist force may be included in the operation console 11. The system control unit 20 performs the control functions according to the commands entered from the operation console 11.

The storage unit 25 stores the program to be executed by the system control unit 20 and other parameters, and may consist of flash memory such as SSD so that the stored data may be maintained even when the power is turned off. The storage unit 25 also provides the function of work memory that temporarily retains various values produced during the computation process in the system control unit 20. In the illustrated embodiment, the storage unit 25 stores the number of steps of the left leg and the number of steps of the right leg during the walking movement of the wearer P. The storage unit 25 may consist of a plurality of sub units that are physically separated from one another to perform particular purposes.

The setting information (configuration information) and various commands transmitted from the external device 27 (which may consist of a smartphone or a remote controller) are forwarded to the system control unit 20, and the step count data obtained by the system control unit 20 is transmitted to the external device 27 via an input/output interface incorporated with a communication unit for such purposes. In the illustrated embodiment, the commands forwarded from the external device 27 to the system control unit 20 includes a measurement start command Cs serving as a trigger for starting the measurement for the walking test and a measurement end command Cf serving as a trigger for ending the measurement for the walking test.

The measurement start command Cs and the measurement end command Cf (which may be collectively referred to as measurement command C) may be generated by the operator who carries out and otherwise oversees the walking test. Alternatively, the measurement command may be automatically generated by a system (not shown in the drawings) for performing the walking test. For instance, a measurement start line and a measurement end line which are spaced apart by a prescribed distance may be marked on the walking path, and the operator may issue the measurement start command Cs by pressing a measurement start switch provided on the external device 27 when the testee walking with a constant rhythm has passed the measurement start line, and the measurement end command Cf by pressing a measurement end switch provided on the external device 27 when the testee has passed the measurement end line.

Alternatively, a detection beam such as an infrared light beam and a laser beam emitted from a light emitter may be directed across the walking path at the measurement start line and the measurement end line so that when the detection beam is interrupted by the testee passing through the measurement start line and the measurement end line, a wireless signal transmitter transmits the measurement start command Cs and the measurement end command Cf, respectively, to the external device 27.

In the illustrated embodiment, the operator issues the measurement start command Cs and the measurement end command Cf by pressing a measurement start switch and a measurement end switch (not shown in the drawings) provided on the external device 27 when the testee has passed the measurement start line and the measurement end line, respectively.

The process of performing the walking step measurement is described in the following with reference to the functional block diagram of FIG. 4 schematically illustrating the various functions performed by the system control unit 20.

As discussed above, the output signal from the right angular position sensor 6R is converted into a right hip joint angle θR representing the state variable of the right leg by the right detection circuit 22, and is forwarded to the system control unit 20. Similarly, the output signal from the left angular position sensor 6L is converted into a left hip joint angle θL representing the state variable of the left leg by the left detection circuit 21, and is forwarded to the system control unit 20. These signals are then processed by the system control unit 20 as will be discussed in the following.

A first differential circuit 31 receives the right hip joint angle θR and the left hip joint angle θL concurrently, and produces a differential angle θS which is given as the difference between these angles (θS=θR−θL). Thus, the first differential circuit 31 continuously produces the differential angle θS. In this regard, the left angular position sensor 6L, the left detection circuit 21, the right angular position sensor 6R, the right detection circuit 22 and the first differential circuit 31 jointly function as a detection unit for detecting the differential angle θS between the right hip joint angle θR and the left hip joint angle θL. The differential angle θS produced from the first differential circuit 31 is forwarded to a local maximum/minimum determination unit 32.

The local maximum/minimum determination unit 32 determines each occurrence of a local maximum or minimum value of the input value or the differential angle θS. As will be discussed hereinafter, a local maximum (positive extremum: the differential angle θS demonstrating an upwardly facing convex curve) is determined as a step of the right leg, and a local minimum (negative extremum: the differential angle θS demonstrating a downwardly facing convex curve) is determined as a step of the left leg. The local maximum/minimum determination unit 32 forwards the determination result and the associated time information to a threshold determination unit 33.

As disclosed in JP5758028B, a pair of low pass filters having mutually different cut-off frequencies and a second differential circuit may be provided between the first differential circuit 31 and the local maximum/minimum determination unit 32 so that noise components and offset components may be removed from the differential angle θS, and the local maximum/minimum determination unit 32 may carry out the determination process on the cleaned differential angle θS. Therefore, even when the testee drags one of the feet while walking, the cleaned differential angle is made more symmetric with respect to the base line (zero amplitude line) so that the determination of the threshold can be performed in a more precise manner. Alternatively, a low pass filter having a relatively high cut-off frequency may be provided between the first differential circuit 31 and the local maximum/minimum determination unit 32 so that only the noise components are removed from the differential angle θS, and the local maximum/minimum determination unit 32 may carry out the determination process on this cleaned version of the differential angle θS.

When the determination result received from the local maximum/minimum determination unit 32 is positive in value or a local maximum, the threshold determination unit 33 compares the determination result with a positive threshold value. If the determination result of the local maximum/minimum determination unit 32 exceeds the threshold value, the threshold determination unit 33 determines that a step of the right leg has been detected, and increments the count of the right leg steps recorded in right leg walking information memory 34 by one. At the same time, the clock information received from the local maximum/minimum determination unit 32 is written into the right leg walking information memory 34 as a count-up time associated with the current count of the right leg steps.

When the determination result received from the local maximum/minimum determination unit 32 is negative in value or a local minimum, the threshold determination unit 33 compares the determination result with a negative threshold value. If the determination result of the local maximum/minimum determination unit 32 exceeds (is smaller than) the threshold value, the threshold determination unit 33 determines that a step of the left leg has been detected, and increments the count of the left leg steps recorded in left leg walking information memory 35 by one. At the same time, the clock information received from the local maximum/minimum determination unit 32 is written into the left leg walking information memory 35 as a count-up time associated with the current count of the left leg steps.

By thus creating a dead band or by the incrementing the step count only when the determination result (extrema) received from the local maximum/minimum determination unit 32 exceeds the corresponding threshold value, an erroneous incrementing of the step count can be avoided such as when the testee is stationary and fidgeting or making minute movements.

When two steps of one of the legs is detected in a consecutive manner without the intervention of the detection of the other leg, the second detection of the step of the one leg is disregarded. The walking steps should occur in an alternating manner between the two legs, and any repeated steps of one of the legs should be discounted as being caused by an irregular movement of the leg.

The sum of the count of the right leg steps recorded in the right leg walking information memory 34 and the count of the left leg steps recorded in the left leg walking information memory 35 gives the final step count of the testee. Thus, the local maximum/minimum determination unit 32 and the threshold determination unit 33 jointly form the step determination unit 36 for counting the number of steps of the testee as a natural number according to the detection result of the angular position sensors 6 serving as a state variable detection unit. The right leg walking information memory 34 and the left leg walking information memory 35 jointly form a walking information storage unit 37 for storing the number of steps (which is incremented by one each time the step determination unit 36 has determined a unit step or a full step) and the associated time information.

As disclosed in JP5758028B, it is also possible to arrange such that the system control unit 20 performs a walking step mode determination process, and the threshold determination unit 33 changes the threshold value for the determination of each step depending on the determined walking step mode.

Upon activation of the walking assist device 1, the step determination unit 36 starts counting each discrete walking step, and ends the counting when the walking assist device 1 is deactivated. When the walking assist device 1 is deactivated, the step determination unit 36 resets the count of the right leg step recorded in the right leg walking information memory 34 and the count of the left leg step recorded in the left leg walking information memory 35. Alternatively, the step determination unit 36 may not reset the counts when the walking assist device 1 is deactivated, and may reset the counts to zero when a reset signal is received from the operation console 11 or from the external device 27.

Figure 5:
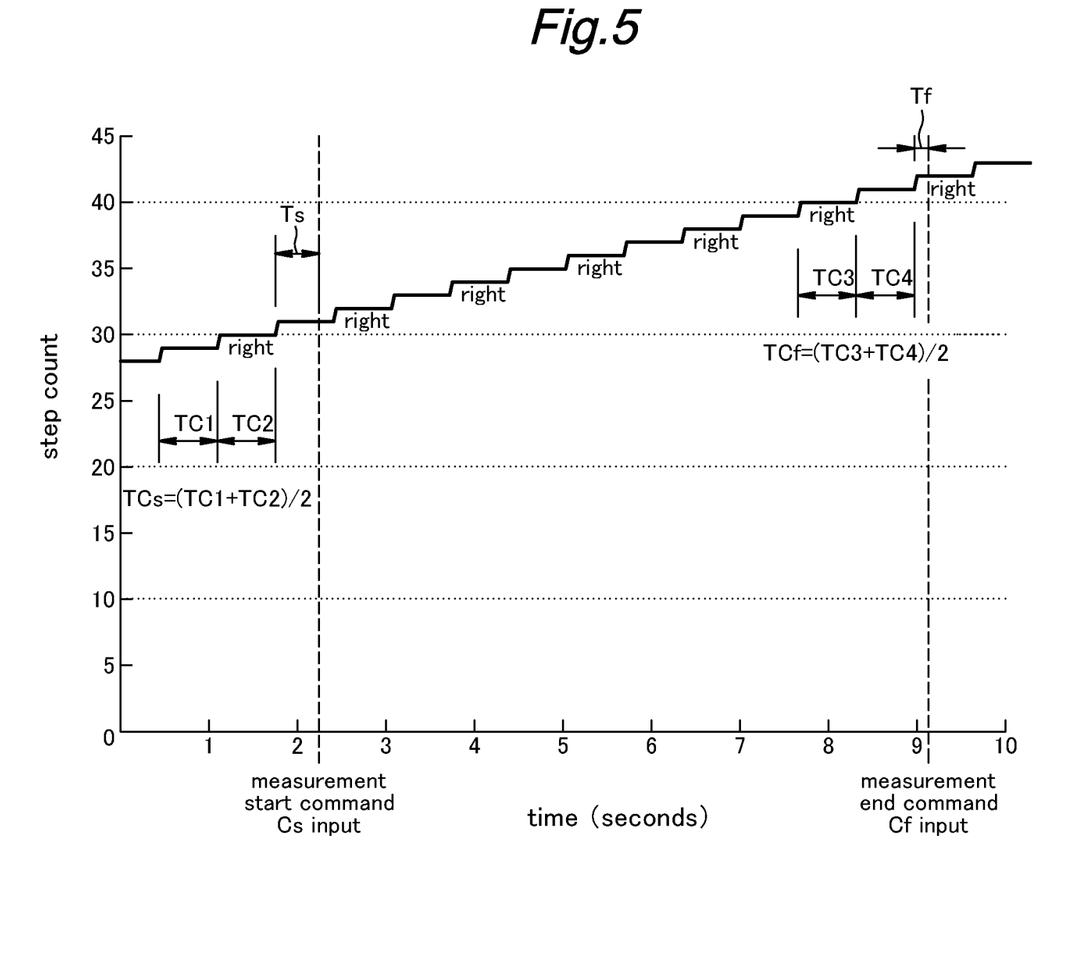
FIG. 5 is a time chart of an exemplary step counting process.

The count of steps incremented by the system control unit 20 changes as shown in FIG. 5, for instance. In the time chart of FIG. 5, the abscissa indicates the time (elapsed time) and the ordinate indicates the count of walking steps. As mentioned earlier, the count of walking steps is a sum of the count of the right leg step recorded in the right leg walking information memory 34 and the count of the left leg step recorded in the left leg walking information memory 35.

The system control unit 20 increments the count by one each time a walking step is determined from the zero count at the time point of initial activation triggered by the operation of the activation switch. In the illustrated embodiment, the count of the walking steps increases at a substantially steady pace. FIG. 5 shows only a part of the entire duration of incrementing the count of the walking steps. In this case, the count is 28 at time zero and 44 when 10 seconds has elapsed. The time change of the count of walking steps of this pattern is typically observed when a healthy person is walking with or without the aid of the walking assist device, and a handicapped person is walking with the aid of the walking assist device.

Referring back to FIG. 4, the description of the system control unit 20 is continued in the following. As discussed above, the measurement command C (measurement start command Cs or measurement end command Cf) produced from the external device 27 is forwarded to the system control unit 20 via the input/output interface 26. When the measurement start command Cs is received by the system control unit 20, a start count computation unit 38 reads data from right leg walking information memory 34 and left leg walking information memory 35, and computes the count of walking steps (start step count Ss) at the start of the measurement to the precision of less than one or to the decimal part. The start step count Ss may be given either by a fraction or by a decimal part. In the illustrated embodiment, the count is given by a decimal part.

More specifically, as shown in FIG. 5, the start count computation unit 38 sums the step counts stored in the right leg walking information memory 34 and the step count stored in the left leg walking information memory 35, and computes the integer part (walking step 30) (or the integer part step count SRs) of the step count. By subtracting the most recent count up time (the time point at which step 30 was counted) from the current time at which the measurement start command Cs was given, the start count computation unit 38 computes the time period Ts measured between the time at which the most recent step count was initiated (or the last stem count was completed) prior to the start of the measurement and the time point of starting the measurement. Based on the count up times stored in the right leg walking information memory 34 and the left leg walking information memory 35, the start count computation unit 38 computes the walking period TCs for each walking step as will be discussed hereinafter, and computes the decimal part step count SFs given as the decimal part (value less than one) of the walking step by dividing the elapsed time Ts from the most recent count up time to the time point of starting the measurement with the walking period TCs (as a ratio of the elapsed time Ts to the walking period TCs) as represented by Equation (1) given in the following. The number of digits of the decimal part step count SFs may be selected depending on the processing speed of the control process and the precision of the angular position sensors 6, but may be selected as desired.

$$SFs=Ts/TCs \tag{1}$$

The start count computation unit 38 then computes the measurement start step count Ss including a decimal part by adding the integer part step count SRs to the decimal part step count SFs as represented by Equation (2) given in the following.

$$Ss=SRs+SFs \tag{2}$$

The computed measurement start step count Ss is provided to a third differential circuit 39 as a value to be subtracted.

In the illustrated embodiment, the start count computation unit 38 uses the average of the times TC1 and TC2 required for the individual full steps of the most recent two steps (step 29 and step 30) prior to the reception of the measurement start command Cs as the walking period TCs as represented by Equation (3) given in the following.

$$TCs=(TC1+TC2)/2 \tag{3}$$

In the illustrated embodiment, the step counted up most recently prior to the start of measurement is performed by the right leg of the user (step 30). The start count computation unit 38 in this case may compute the walking period TCs by dividing the time interval between the time points of completing of the last two steps of the right leg which are stored in the right leg walking information memory 34 required for the last two full steps (steps 28 and 30) preceding the step which was in progress at the time point of starting the walking test with two.

Referring to FIG. 4 once again, upon receiving the measurement end command Cf, a measurement end count computation unit 40 of the system control unit 20 reads data from the right leg walking information memory 34 and the left leg walking information memory 35, and computes the step count (measurement end step count Sf) at the time point of receiving the measurement end command Cf or at the end of the measurement to a decimal part. The end step count Sf may be given either by a fraction or by a decimal part. In the illustrated embodiment, the count is given by a decimal part.

More specifically, as shown in FIG. 5, the end count computation unit 40 sums the step counts stored in the right leg walking information memory 34 and the step count stored in the left leg walking information memory 35, and computes the integer part (step 41) (or the integer part step count SRf) of the step count. By subtracting the most recent count up time (the time point at which step 41 was completed, and step 42 was initiated) from the current time point at which the measurement end command Cf was given, the end count computation unit 40 computes the time period Tf measured between the time at which the most recent step count was determined prior to the end of the measurement and the time point of ending the measurement. Based on the count up times stored in the right leg walking information memory 34 and the left leg walking information memory 35, the end count computation unit 40 computes the walking period TCf for each walking step, and computes the decimal part end step count SFf given as the decimal part (value less than one) of the walking step by dividing the elapsed time Tf from the most recent count up time to the time point of ending the measurement as represented by Equation (4) given in the following. The number of digits of the decimal part end step count SFf may be selected as desired.

$$SFf=Tf/TCf \tag{4}$$

The end count computation unit 40 then computes the measurement end step count Sf including a decimal part by adding the integer part step count SRf to the decimal part end step count SFf as represented by Equation (5) given in the following.

$$Sf=SRf+SFf \tag{5}$$

The computed measurement end step count Sf is provided to the third differential circuit 39 as a value to be added.

In the illustrated embodiment, the end count computation unit 40 uses the average of the times TC3 and TC4 required for the individual steps of the most recent two steps (step 40 and step 41) prior to the reception of the measurement end command Cf as a walking period TCf as represented by Equation (6) given in the following.

$$TCf=(TC3+TC4)/2 \tag{6}$$

In the illustrated embodiment, the step counted up most recently prior to the end of measurement is performed by the left leg of the user (step 41). The end count computation unit 40 in this case may compute the walking period TCs by dividing the time interval between the time points of completing of the last two steps of the left leg which are stored in the left leg walking information memory 35 required for the last two full steps (steps 39 and 41) preceding the step which was in progress at the time point of ending the walking test with two.

Based on the measurement start step count Ss and the measurement end step count Sf computed by the start count computation unit 38 and the end count computation unit 40, respectively, the third differential circuit 39 computes the measured step count S of the walking test (or the walking step count that is required for the testee to travel the prescribed distance) to a decimal part. More specifically, the third differential circuit 39 computes the measured step count S of the walking test by subtracting the measurement start step count Ss from the measurement end step count Sf as represented by Equation (7) given in the following.

$$S = Sf - Ss \quad (7)$$

The measured step count S computed by the third differential circuit 39 is transmitted to the external device 27 via the input/output interface 26, and is written into measured step count memory 41.

In this conjunction, the start count computation unit 38, the end count computation unit 40 and the third differential circuit 39 jointly form the step count computation unit 42 that computes the measured step count measured between the measurement start time point and the measurement end time point for step count measurement according to a prescribed rule to the precision of less than one from the step counts and the associated time information stored in the walking information storage unit 37.

Figure 6:
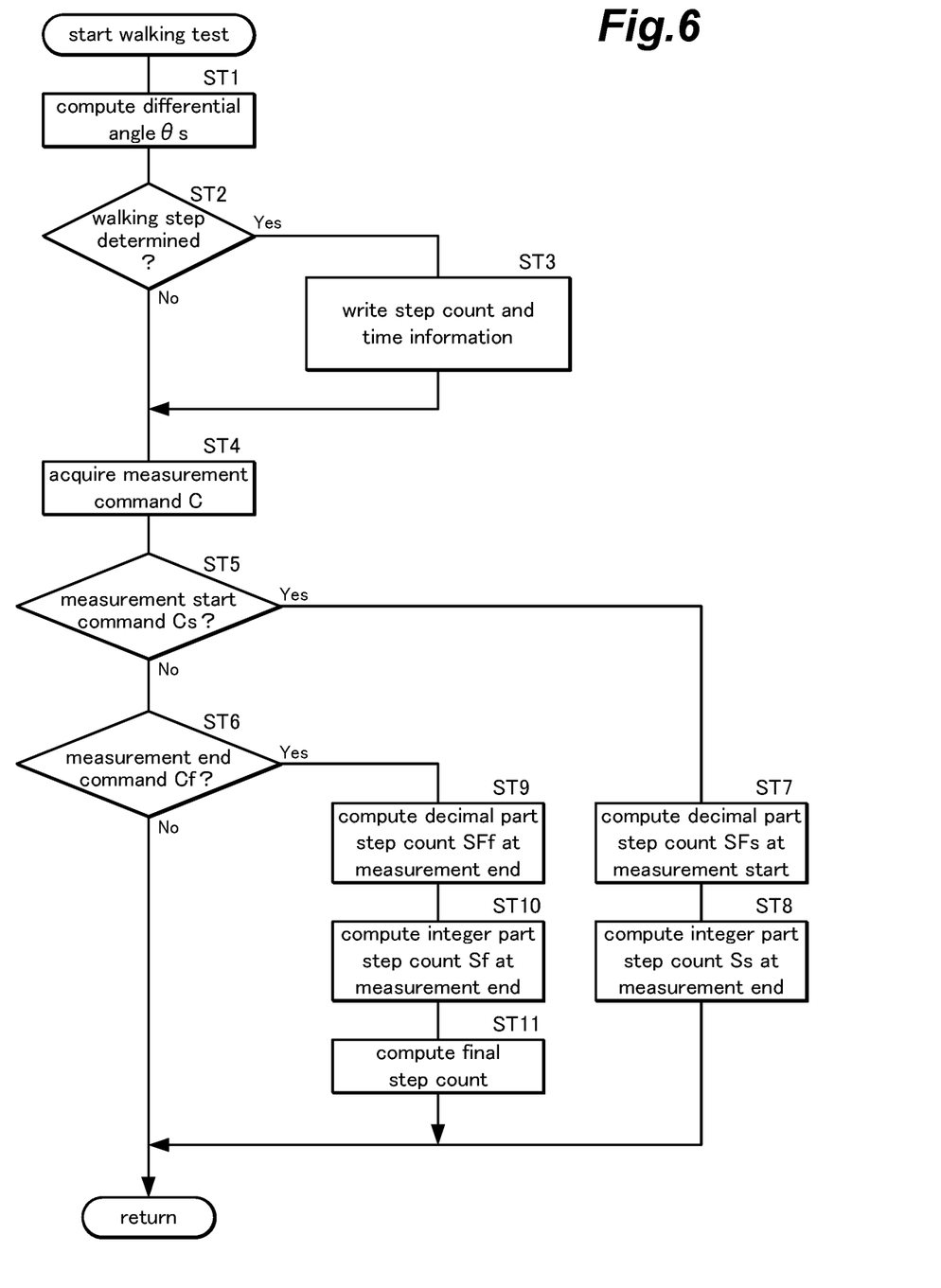
FIG. 6 is a flowchart of the walking step counting process executed by the system control unit shown in FIG. 3.

Referring to FIG. 6, the process flow of the walking test control executed by the system control unit 20 is described in the following. When the activation switch is operated by a user, and an initialization step is completed by reading out the control program from the storage unit 25, the system control unit 20 starts the process of the walking test control shown in FIG. 6 at a prescribed control cycle. In the illustrated embodiment, the contents of the walking information storage unit 37 were cleared when the walking assist device 1 was previously turned off so that the counts of the walking steps of both the right leg and the left leg stored in the right leg walking information memory 34 and the left leg walking information memory 35 are both zero at the start of the walking test control process.

Upon activation, the step determination unit 36 of the system control unit 20 computes the differential angle θS between the right hip joint angle θR and the left hip joint angle θL obtained from the right detection circuit 22 and the left detection circuit 21 (step ST1). The step determination unit 36 then determines if a unit step (a full step) has been determined by performing a local minimum/maximum determination process and a threshold determination process (step ST2). When a walking step has been determined in step ST2, the system control unit 20 writes the incremented step count and the count up time in the walking information storage unit 37 (step ST3), and the program flow advances to step ST4 while retaining the obtained information. When no walking step is detected in step ST2, the program flow advances to step ST4 without performing the process of step ST3.

The system control unit 20 receives a measurement command C in step ST4, and the step count computation unit 42 determines if the measurement command C consists of a measurement start command Cs in step ST5. If no measurement start command Cs is received in step ST5 (No), the system control unit 20 determines if the measurement command C consists of a measurement end command Cf in step ST6. If no measurement end command Cf is received in step ST6 (No), the system control unit 20 returns to step ST1, and the foregoing process is repeated.

Each time a walking step is determined in step ST2 (Yes), the system control unit 20 records the step count and the count up time in step ST3.

When a measurement start command Cs is determined in step ST5 (Yes), the start count computation unit 38 computes the decimal part step count SFs at the time point of starting the measurement (upon receiving the measurement start command Cs) (step ST7), and computes the start step count Ss to the precision of less than one by adding the decimal part step count SFs to the integer part step count SRs (step ST8). The program flow than returns to step ST1.

In the subsequent control process, the determination result of step ST5 remains to be Yes, and the determination result of step ST6 remains No and the program flow returns to step ST1 until the determination result of step ST6 changes to Yes. Each time a walking step is determined in step ST2 (yes), the system control unit 20 repeats the step of recording the step count and the count up time in step ST3.

When a measurement end command Cf is determined in step ST6 (Yes), the end count computation unit 40 computes the decimal part end step count SFf at the time point of ending the measurement (upon receiving the measurement end command Cf) (step ST9), and computes the end step count Sf to the precision of less than one by adding the decimal part end step count SFf to the integer part step count SRf (step ST10). The third differential circuit 39 computes the measured step count S to the decimal part by subtracting the start step count Ss from the end step count Sf (step ST11), and the program flow than returns to step ST1.

The mode of operation of the step counting unit 12 is described in the following with reference to FIG. 5. In the example shown in FIG. 5, the measurement start count computation unit 38 computes the measurement start step count Ss at the time point of receiving the measurement start command Cs as 30.76 steps by adding the decimal part step count SFs (0.76) to the integer part step count SRs (30). Similarly, the measurement end count computation unit 40 computes the measurement end step count Sf at the time point of receiving the measurement end command Cf as 41.29 steps by adding the decimal part end step count SFf (0.29) to the integer part step count SRf (41). The third differential circuit 39 computes the measured step count S of the walking test as 10.53 by subtracting the measurement start step count Ss (30.76) from the measurement end step count Sf (41.29).

On the other hand, in the case of a conventional walking step count measurement device, because both the measurement start step count Ss and the measurement end step count Sf are treated as integers, the measurement start step count Ss and the measurement end step count Sf are given as 30 and 41, respectively, in the case of the example shown in FIG. 5 so that the measured step count S of the walking test would be computed as 11.

As discussed above, the step counting unit 12 incorporated in the walking assist device 1 of the illustrated embodiment includes angular position sensors 6 for detecting the hip joint angles θ or state variable detection means for detecting the state variable that changes with the walking movement of the wearer, the walking step determination unit 36 for determining each unit step according to the detection results of the angular position sensors 6, the walking information storage unit 37 for storing the step count which is incremented when the walking step determination unit 36 has detected each unit walking step and the associated time information, and the step count computation unit 42 for computing the measurement start step count Ss and the measurement end step count Sf according to the walking step count and the associated time information stored in the walking information storage unit 37 to the precision of the decimal part. Therefore, the measurement start step count Ss and the measurement end step count Sf can be computed to the precision of the decimal parts according to the walking step count and the associated time information.

Furthermore, the step count computation unit 42 computes the measurement start step count Ss according to the elapsed time Ts from the time point at which a walking step is last determined immediately preceding the time point of starting the measurement, and computes the measurement end step count Sf according to the elapsed time Tf from the time point at which a walking step is last determined immediately preceding the time point of ending the measurement. Therefore, the decimal part step counts SFs and SFf of the measurement start step count Ss and the measurement end step count Sf can be computed in an accurate manner.

Alternatively, the walking period of the user may be obtained as a time period required to complete a walking step which was in progress at the time point of terminating the measurement operation. This may be applied to the decimal part step count at the time point of starting the measurement. Similarly, it may be arranged such that the walking period of the user is obtained as an average of a time period required to complete a walking step which was in progress at the time point of terminating the measurement operation, and at least a time period required for one full walking step preceding or following the time point of terminating the measurement operation. This may be applied to the decimal part step count at the time point of starting the measurement.

The step count computation unit 42 may compute the walking periods TCs and TCf as the averages of the time periods TC1 and TC2, and TC3 and TC4 required for two or more steps immediately preceding the reception of the measurement start command Cs and the measurement end command Cf, respectively. Therefore, even when the gait of the testee should be disturbed immediately before the time point of starting or ending the measurement, the decimal part step count SFs or SFf can be measured in an accurate manner.

In the illustrated embodiment, the step count computation unit 42 computes the measurement start step count Ss and the measurement end step count Sf to the precision of the decimal parts according to the step counts and the associated time information stored in the walking information storage unit 37, and computes the measured step count S to the precision of the decimal part by subtracting the measurement start step count Ss from the measurement end step count Sf. Therefore, the measured step count S can be computed to the precision of the decimal part.

Owing to the precision accomplished by the illustrated embodiment, any improvement in the gait of the testee that may be made by a particular rehabilitation program or by the use of the walking assist device can be numerically ascertained so that the improvement can be made evaluated in a highly accurate manner.

The walking assist device 1 of the illustrated embodiment includes the step counting unit 12 in addition to the swing arms 7, the femoral support plates 8 and the femoral belts 9 which are worn by the user to apply assist forces to the lower limbs of the user. Thereby, the walking assist device 1 that can compute the measured step count S to the precision of the decimal part is provided.

The step count computation program used in the step counting unit 12 of the walking assist device 1 causes the computer to execute step ST2 for determining each integer step count according to the state variable that changes with the walking movement of the testee, step ST3 for storing the step count that is incremented each time a unit step is determined and the associated time information, and steps ST7-ST8 and ST9-ST10 for computing the measurement start step count Ss and the measurement end step count Sf, respectively, to the precision of the decimal parts. Thereby, a step count computation program that can compute the measured step count S to the precision of the decimal part is provided.

Modified Embodiment

A modified embodiment of the present invention is described in the following primarily with reference to FIG. 7. To avoid redundancy, the parts corresponding to those of the previous embodiment may be omitted in the following description.

The control unit 10 incorporated in the walking assist device is similar to the counterpart illustrated in FIG. 3, and the system control unit 20 is similar to the counterpart illustrated in FIG. 4. In this modified embodiment, the start count computation unit 38 and the end count computation unit 40 of the step count computation unit 42 perform computation processes differently from those of the previous embodiment.

More specifically, first of all, the start count computation unit 38 distinguishes whether the decimal part step count SFs which is current upon receiving the measurement start command Cs is caused by the left leg or the right leg of the testee. As shown in FIG. 7, in the illustrated example, the decimal part step count SFs which is current upon receiving the measurement start command Cs is caused by the left leg. The start count computation unit 38 determines the elapsed time Ts from the time point at which a unit step count (full step count) is last detected to the time point of receiving the measurement start command Cs. The elapsed time Ts is then divided by the time period TC5 (=TCs) that was required for completing the last unit step of the same leg (the left leg in the illustrated example) as that provided the decimal part step count SFs. In the illustrated embodiment, to determine the decimal part step count SFs, the start count computation unit 38 divides the elapsed time Ts with the time period TC5 (=TCs) required for the step (step 29) before the last unit step (full step) (step 30) preceding the reception of the measurement start command Cs.

In this case, the walking step which was taking place at the time point of starting the measurement is made by the left leg. Therefore, the start count computation unit 38 computes the walking period TCs by subtracting the time point of starting the last walking step (step 29) of the left leg (stored in the left leg walking information memory 35) from the time point of starting the last walking step (step 30) of the right leg (stored in the right leg walking information memory 34).

Similarly, the end count computation unit 40 distinguishes whether the decimal part end step count SFf which is current upon receiving the measurement end command Cf is caused by the left leg or the right leg of the testee. In the illustrated embodiment, the step at the time point of ending the measurement is made by the right leg. The end count computation unit 40 determines the elapsed time Tf from the time point at which a unit step count (full step count) is last detected prior to the reception of the measurement end command Cf to the time point of ending the measurement. The elapsed time Tf is then divided by the time period TC6 (=TCf) that was required for completing the last unit step of the same leg as that provided the decimal part end step count SFf. In the illustrated embodiment, to determine the decimal part end step count SFf, the end count computation unit 40 divides the elapsed time Tf with the time period TC6 (=TCf) required for the step (step 40) before the last unit step (full step) (step 41) preceding the reception of the measurement end command Cf.

In this case, the walking step which was taking place at the time point of ending the measurement is made by the right leg. Therefore, the end count computation unit 40 computes the walking period TCf by subtracting the time point of starting the last walking step (step 40) of the right leg (stored in the right walking information memory 35) from the time point of starting the last walking step (step 41) of the left leg (stored in the left leg walking information memory 35).

Figure 7:
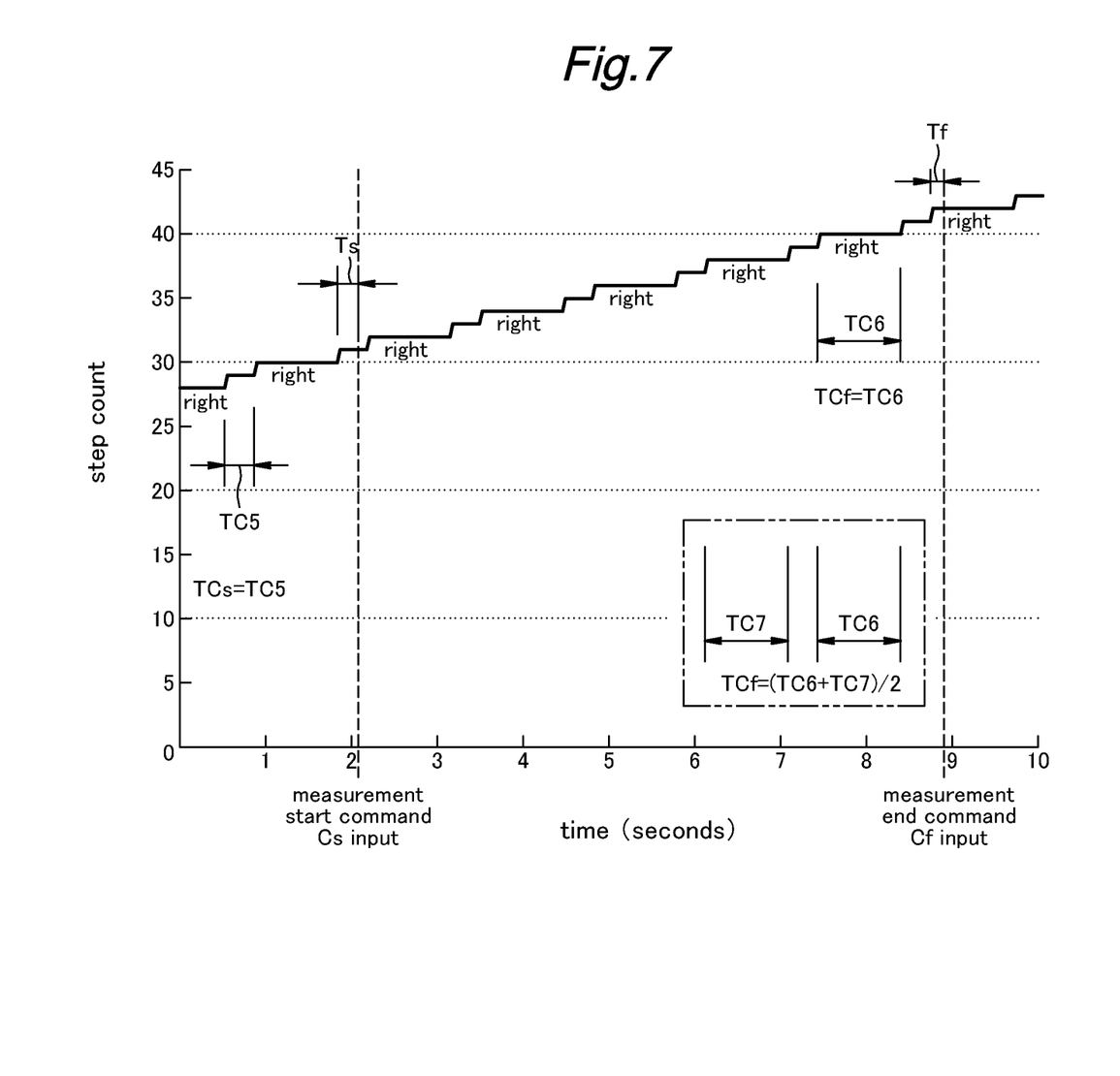
FIG. 7 is a time chart similar to FIG. 5 showing the walking step counting process of a modified embodiment.

Therefore, even when the testee is more impaired in one of the legs than the other so that the right step takes a longer period of time than the left leg in completing each walking step (the left leg is more impaired than the right leg in the example shown in FIG. 7), in spite of the asymmetric nature of the walking pattern, the start step count Ss and the end step count Sf can be determined to the accuracy of the decimal parts thereof by the measurement start count computation unit 38 and the measurement end count computation unit 40, respectively. Based on these results, the third differential circuit 39 is enabled to compute the measured step count S to the accuracy of the decimal part thereof.

The step counting unit 12 incorporated in the walking assist device 1 of the modified embodiment distinguishes if the decimal part step count is caused by which of the legs of the testee, and uses the time period required for the full step of the corresponding leg as the walking period with which the duration of the partial step to be divided to determine the decimal part step count. The time period TC5 is used as the step period TCs in the case of determining the start decimal part step count SFs, and the time period TC6 is used as the step period TCf in the case of determining the end decimal part end step count SFf. Thus, even when the gait of the right and left legs are asymmetric, the decimal part step counts and SFs and SFf can be computed in an accurate manner.

As a further variation of the modified embodiment, at least one of the start count computation unit 38 and the end count computation unit 40 may use the average of at least two last full steps preceding the time point of starting or ending the measurement, as the case may be, which are caused by the leg of the same side as that caused by the corresponding decimal part step count, as the step period for computing the decimal part step count SFs or SFf. Such a case is illustrated in a part of FIG. 7 surrounded by the double-dot chain-dot line. In this case, the walking step by the right leg was in progress at the time point of receiving the measurement end command Cf. The step period TCf for computing the decimal part step count is given as the average of the time periods TC6 and TC7 required for the last two right leg steps preceding the reception of the measurement end command Cf. The decimal part end step count SFf is computed by dividing the elapsed time Tf from the time point of starting the last right leg step (step 42) to the reception of the measurement end command Cf with the average (TCf=(TC6+TC7)/2) of the time period (TC6) required for the last full left leg step (step 38) preceding the reception of the measurement end command Cf and the time period (TC7) required for the full left leg step before the last (penultimate left leg step) (step 40).

The present invention has been described in terms of specific embodiments, but is not limited by such embodiment, and the various components of the present invention can be modified and substituted without departing from the spirit of the present invention. For instance, in the foregoing embodiments, the state variable that changes in response to the walking movement of the user was based on the hip joint angles θL and Rθ detected by the respective angular position sensors 6, but may also be based on the hip joint angular speeds detected by respective angular speed sensors.

In the foregoing embodiments, each step was detected from the local minimal/maximum of the differential angle θS detected from the detected values of the angular position sensors 6. However, each step may also be detected by using a phase plane having the angular position and the angular speed of each leg for the abscissa and ordinate thereof, or a phase plane having the differential angle and the differential angular speed of the two legs for the abscissa and ordinate thereof. In either case, the decimal part step count SF (SFs, SFf) can be computed from the step count and the time information stored in the walking information storage unit 37.

The algorithms and computations discussed above are only exemplary, and can be modified and substituted without departing from the spirit of the present invention. In the preceding embodiment, the walking periods TCs and TCf for computing the decimal part step counts SFs and SFf (as well as the measurement start step count Ss and the measurement end count Sf) were compute immediately after the reception of the measurement start command Cs and the measurement end command Cf, respectively. However, the walking periods TCs and TCf may be measured or computed from the walking steps following the reception of the measurement start command Cs and the measurement end command Cf, respectively. As a further variation, it is also possible to compute the walking periods TCs and TCf by averaging the time periods required for walking steps before and after the reception of the measurement start command Cs and the measurement end command Cf, respectively.

The contents of the original Japanese patent application JP2015-180464 on which a Paris Convention priority is claimed for this application, as well as any references mentioned in this application, are hereby incorporated in this application by reference.

The invention claimed is:

1. A pedometer, comprising:
a clock for obtaining time information associated with a walking movement of a user;
a switch for initiating and terminating a measurement operation of the pedometer;
a state variable detection unit for detecting a state variable indicating the walking movement of the user;

a walking step determination unit for determining each walking step of the user from an output of the state variable detection unit;

a walking information storage unit for incrementing a step count each time a walking step is determined by the walking step determination unit and storing the incremented step count and the associated time information obtained by the clock; and a walking step count computation unit for computing a walking step count of the user from a time point of initiating the measurement operation to a time point of terminating the measurement operation to a decimal part according to the step count and the associated time information stored in the walking information storage unit, wherein the walking step count computation unit is configured to compute a walking step count at the time point of terminating the measurement operation as a sum of the step count stored in the walking information storage unit and a ratio of a time interval between an end of a last full walking step and the time point of terminating the measurement operation to a prescribed walking period of the user.

2. The pedometer according to claim 1, wherein the walking period of the user is obtained as a time period required for a full walking step preceding the time point of terminating the measurement operation or a full walking step following the time point of terminating the measurement operation.

3. The pedometer according to claim 2, wherein the walking period of the user is obtained as a time period required for a full walking step immediately preceding the time point of terminating the measurement operation or a full walking step immediately following the time point of terminating the measurement operation.

4. The pedometer according to claim 1, wherein the walking period of the user is obtained as an average of time periods required for a plurality of full walking steps preceding and/or following the time point of terminating the measurement operation.

5. The pedometer according to claim 1, wherein the walking period of the user is obtained as a time period required to complete a walking step which was in progress at the time point of terminating the measurement operation.

6. The pedometer according to claim 1, wherein the walking period of the user is obtained as an average of a time period required to complete a walking step which was in progress at the time point of terminating the measurement operation, and at least a time period required for one full walking step preceding or following the time point of terminating the measurement operation.

7. The pedometer according to claim 1, wherein the walking information storage unit is configured to increment the step count according to a difference between steps made by a right leg and a left leg of the user, and to store the incremented step count with an indication whether the last step count is caused by the right leg or the left leg.

8. The pedometer according to claim 7, wherein the walking period of the user is obtained as a time period required for a full walking step preceding the time point of terminating the measurement operation by two steps or a full walking step following the time point of terminating the measurement operation by two steps.

9. The pedometer according to claim 7, wherein the walking period of the user is obtained as an average of time periods required for a plurality of full walking steps made by one of the legs of the user preceding and/or following the time point of terminating the measurement operation, the one leg being the one that has made the walking step that was in progress at the time point of terminating the measurement operation.

10. The pedometer according to claim 1, wherein the walking step count computation unit computes a step count at the time point of initiating the measurement operation according to the step count stored in the walking information storage unit and a time interval between an end of a last full walking step and the time point of initiating the measurement operation.

11. A pedometer comprising:
a clock for obtaining time information associated with a walking movement of a user;
a switch for initiating and terminating a measurement operation of the pedometer;
a state variable detection unit for detecting a state variable indicating the walking movement of the user;
a walking step determination unit for determining each walking step of the user from an output of the state variable detection unit;
a walking information storage unit for incrementing a step count each time a walking step is determined by the walking step determination unit and storing the incremented step count and the associated time information obtained by the clock; and
a walking step count computation unit for computing a walking step count of the user from a time point of initiating the measurement operation to a time point of terminating the measurement operation to a decimal part according to the step count and the associated time information stored in the walking information storage unit,
wherein the walking step count computation unit is configured to compute a step count at the time point of initiating the measurement operation as a sum of the step count stored in the walking information storage unit and a ratio of a time interval between an end of a last full walking step and the time point of initiating the measurement operation to a prescribed walking period of the user.

12. A walking assist device, comprising:
a walking assist unit configured to be worn by a user to apply a force to a body part of the user for assisting the user to walk; and
the pedometer according to claim 1 incorporated in the walking assist unit.

* * * * *